United States Patent
Johnson

(10) Patent No.: US 9,088,457 B1
(45) Date of Patent: Jul. 21, 2015

(54) TRANSMISSION OF AN APPLICATION DOWNLOAD VIA AN ENCODED IMAGE IDENTIFYING THE AUTHORIZED RECIPIENT

(71) Applicant: Amazon Technologies, Inc., Reno, NV (US)

(72) Inventor: Stephen C. Johnson, Fullterton, CA (US)

(73) Assignee: Amazon Technology, Inc., Seattle, WA (US)

( * ) Notice: Subject to any disclaimer, the term of this patent is extended or adjusted under 35 U.S.C. 154(b) by 125 days.

(21) Appl. No.: 13/870,372

(22) Filed: Apr. 25, 2013

(51) Int. Cl.
   *G06F 17/30* (2006.01)
   *H04L 29/08* (2006.01)

(52) U.S. Cl.
   CPC .......... *H04L 29/08* (2013.01); *G06F 17/30047* (2013.01)

(58) Field of Classification Search
   CPC ................................................. G06F 17/30047
   USPC ......................................................... 235/375
   See application file for complete search history.

(56) References Cited

U.S. PATENT DOCUMENTS

| | | | |
|---|---|---|---|
| 8,346,847 B2 * | 1/2013 | Steakley | 709/202 |
| 8,554,836 B1 * | 10/2013 | Wilson et al. | 709/203 |
| 2008/0301231 A1 * | 12/2008 | Mehta et al. | 709/204 |
| 2012/0036218 A1 * | 2/2012 | Oh et al. | 709/217 |

* cited by examiner

*Primary Examiner* — Thien M Le
*Assistant Examiner* — Toan Ly
(74) *Attorney, Agent, or Firm* — Thomas Horstemeyer, LLP

(57) ABSTRACT

Disclosed are various embodiments for transmitting an application download from a donor to a recipient or recipients. The donor defines parameters for transferring the application download, including payment distribution between the donor and recipient, delivery method of a notification of the application download to the recipient, identification of the recipient or recipients, a deadline for downloading the application, a maximum number of recipients, and other data relevant to transmitting an application download. Parameters are encoded in an identifier that may be decoded by the recipient's client device or that may be imaged and sent to a server providing the application download service. Various embodiments display the encoded identifier to the recipient via electronic displays or printed mediums. The recipient scans or captures an image of the displayed encoded identifier using a client device.

20 Claims, 9 Drawing Sheets ent. The encoded identifier may comprise, for example, a barcode, such as a quick response (QR) code, an image, text, or some other identifier that may contain information regarding the application download gift. The encoded identifier may be transmitted to the recipient by many delivery methods. For example, a printed image of the encoded identifier may be provided to the recipient, such as in a greeting card, advertisement, or other printed medium. Alternatively, or additionally, an image of the encoded identifier may be electronically transmitted, such as through email, social media, electronic billboards, or another electronic display of the encoded identifier.

TRANSMISSION OF AN APPLICATION DOWNLOAD VIA AN ENCODED IMAGE IDENTIFYING THE AUTHORIZED RECIPIENT

BACKGROUND

People often download applications. Applications may be games, books, reference materials, business assistance, comics, communication applications, education aids, productivity enhancers, entertainment, finance aids, health and fitness services, lifestyle materials, media, electronic wallpapers, music, audio, news, magazines, publications, photography, shopping resources, social media, sports tools, transportation aids, weather aids, widgets, or other electronic applications people use.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
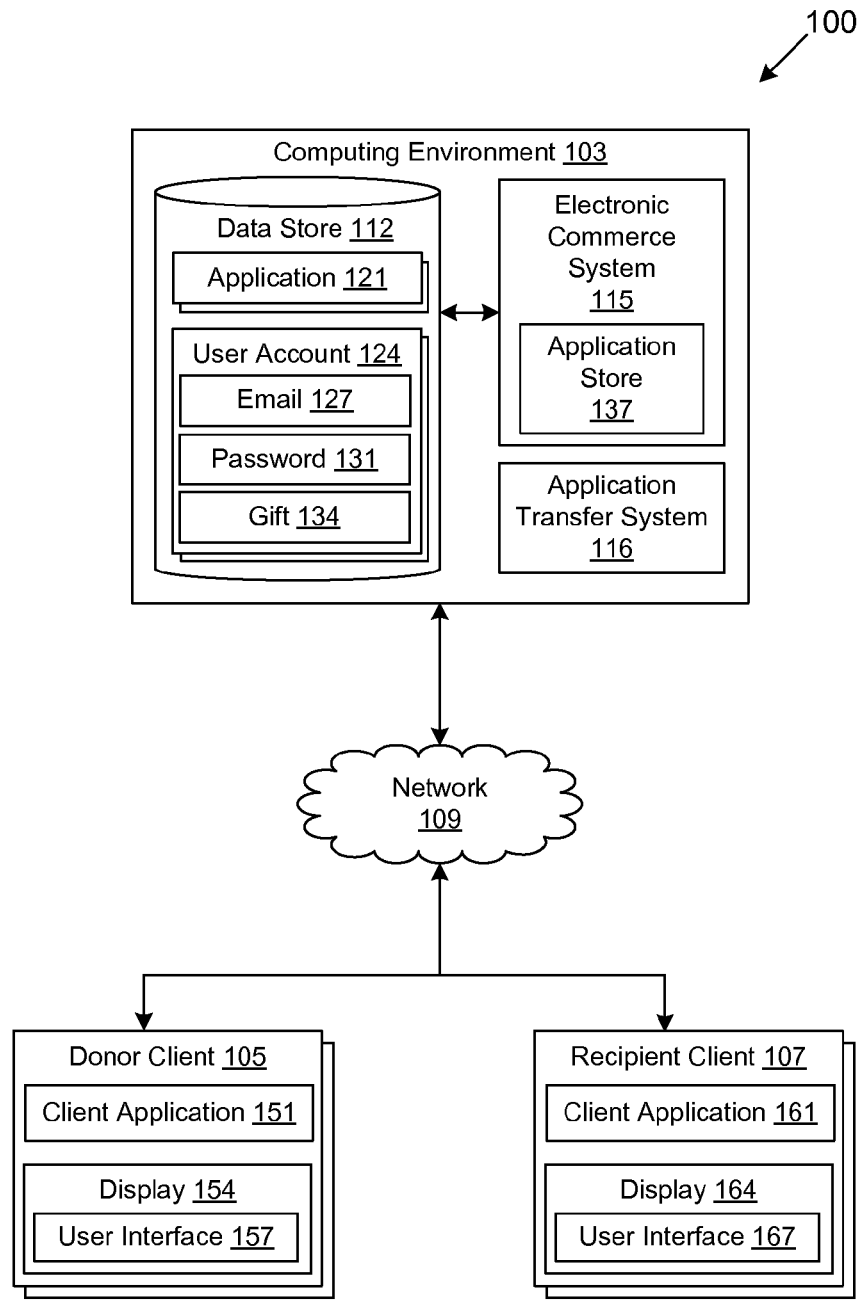
FIG. 1 is a drawing of a networked environment according to various embodiments of the present disclosure.

Users download applications from application stores. An application store may have many applications available for download at a variety of prices. Users may seek to provide an application download to another user. For example, a user may seek to give a download of a tennis game application to a friend as a birthday gift. When gifting an application download, the user may define parameters for providing the application download to the other user. For example, a user may seek to gift an application download to another by paying for all or a portion of the application download, give a certain number of downloads to others, allow others to download an application for a certain amount of time, or otherwise define parameters for giving application downloads to others. The user may identify the recipient of the application download by identifying an account used by the recipient to download applications from the application store. Alternatively, or additionally, the user may identify the recipient by credentials of the device the recipient may use for downloading the application or in some other way that allows the application store providing the download to verify the identity of the recipient requesting the application download.

The recipient may be notified of the application download given by the donor in many ways. For example, an encoded identifier may be generated that contains information concerning the application purchase for a given recipient, the parameters associated with the download, and other information relevant to providing an application download to a recipient. The encoded identifier may comprise, for example, a barcode, such as a quick response (QR) code, an image, text, or some other identifier that may contain information regarding the application download gift. The encoded identifier may be transmitted to the recipient by many delivery methods. For example, a printed image of the encoded identifier may be provided to the recipient, such as in a greeting card, advertisement, or other printed medium. Alternatively, or additionally, an image of the encoded identifier may be electronically transmitted, such as through email, social media, electronic billboards, or another electronic display of the encoded identifier.

The recipient may obtain the application download from the encoded identifier in many ways. For example, the recipient may obtain the application download by capturing an image of the encoded identifier using a client device. This may be done by using the camera in the client device to capture an image of the encoded identifier. Alternatively, or additionally, an application on the client device may scan and capture an image of the encoded identifier. Capturing the image may occur automatically or upon an action by the client device. For example, while executing an application store application, if an encoded image is recognized automatically by the camera on the device, the encoded identifier may be automatically captured without executing the camera application. Alternatively, the client device may notify the user of the presence of the encoded identifier and capture the image upon direction to do so through a camera application, application store application, or other application executing on the client device. Once the image of the encoded identifier is obtained, the client device may decode the encoded identifier, the client device may send the image to a server from which it will download the application for the server to decode the image, or the client device may send the image to another device for decoding.

The client device may be authenticated based on the parameters identified by the donor of the application prior to initiating the application download. Parameters may define limitations on the recipient or recipients of the application download. For example, the client device credentials may be verified as matching the credentials of the intended recipient identified by the donor. As another example, if a maximum number of downloads of the application was identified in the parameters, then authorization may include comparing the total number of downloads thus far to the maximum number of authorized application downloads. If a deadline or timeframe for downloading the application was identified, then authorization may include comparing the timestamp of the authorization to the deadline or timeframe. Other parameters may be checked during authorization. If a client device is not authorized to download the application, the donor may be notified and given the opportunity to authorize the application download. If a client device is authorized to download the application, then the download may be automatically initiated or initiated upon some further action.

In the following discussion, a general description of the system and its components is provided, followed by a discussion of the operation of the same.

With reference to FIG. 1, shown is a networked environment 100 according to various embodiments. The networked environment 100 includes a computing environment 103, a donor client device 105, and a recipient client device 107, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include an electronic commerce system 115, application transfer system 116, and other applications, services, processes, systems, engines, or functionality not discussed in detail herein. The electronic commerce system 115 is executed to facilitate the purchase of items over network 109. The electronic commerce system 115 also performs various backend functions associated with the online presence of a merchant or electronic marketplace to facilitate the online purchase of items. For example, the electronic commerce system 115 may generate network pages or portions thereof that are provided to donor clients 105 and recipient clients 107 for the purposes of selecting items for purchase, rental, download, lease, or other forms of consumption. The electronic commerce system 115 executes an application store 137 for purchasing application downloads.

The application transfer system 116 is executed to generate and facilitate transmission of application downloads via encoded identifiers between donors and recipients. The application transfer system 116 also performs various backend functions associated with transferring application downloads. For example, the application transfer system 116 may obtain and modify applications 121 available in the application store 137, user accounts 124 that identify parties to a transmission of an application download, and other data necessary for transferring application downloads.

The data stored in the data store 112 includes, for example, applications 121, user accounts 124, and potentially other data. Applications 121 includes data related to applications available for download. For instance, applications 121 may include game titles, prices, developers, ratings, or other data related to applications. User accounts 124 contain data related to users of the electronic commerce system 115, the application store 137, and the application transfer system 116. Each user account 124 has log in information such as an email 127 and a password 131, data related to a gift 134 of an application download, and/or other information.

The donor client 105 is representative of a plurality of client devices that may be coupled to the network 109. The donor client 105 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The donor client 105 may include a display 154. The display 154 may comprise, for example, one or more devices such as liquid crystal display 154 (LCD) display 154, gas plasma-based flat panel display 154, organic light emitting diode (OLED) display 154, LCD projectors, or other types of display 154 devices, etc.

The donor client 105 may be configured to execute various applications such as a client application 151 and/or other applications. The client application 151 may be executed in a donor client 105, for example, to access network content served up by the computing environment 103 and/or other servers, thereby rendering a user interface 157 on the display 154. To this end, the client application 151 may comprise, for example, a browser, a dedicated application, etc., and the user interface 157 may comprise a network page, an application screen, etc. The donor client 105 may be configured to execute applications beyond the client application 151 such as, for example, email applications, social networking applications, word processors, spreadsheets, and/or other applications.

The recipient client 107 is representative of a plurality of client devices that may be coupled to the network 109. The recipient client 107 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The recipient client 107 may include a display 164. The display 164 may comprise, for example, one or more devices such as liquid crystal display 164 (LCD) display 164, gas plasma-based flat panel display 164, organic light emitting diode (OLED) display 164, LCD projectors, or other types of display 164 devices, etc.

The recipient client 107 may be configured to execute various applications such as a client application 161 and/or other applications. The client application 161 may be executed in a recipient client 107, for example, to access network content served up by the computing environment 103 and/or other servers, thereby rendering a user interface 167 on the display 164. To this end, the client application 161 may comprise, for example, a browser, a dedicated application, etc., and the user interface 167 may comprise a network page, an application screen, etc. The recipient client 107 may be configured to execute applications beyond the client application 161 such as, for example, email applications, social networking applications, word processors, spreadsheets, and/or other applications.

Next, a general description of the operation of the various components of the networked environment 100 is provided. To begin, a donor at a donor client 105 may access the application store 137 in the electronic commerce system 115 through one or more user interfaces 157 rendered from content generated at least in part by an electronic commerce system 115 and sent across the network 109 to be rendered for display 154 by a client application 151. A donor may be an individual, a manufacturer, an application developer, an advertiser, or other entity seeking to donate application downloads to one or more recipients. In the application store 137, the donor may select an application download to purchase for a third party.

Then, the donor may select parameters for giving the application download to one or more others. For example, the donor may select parameters related to the recipient or recipients of the application download. These parameters may include authentication credentials, such as an identifier of a specific recipient (e.g., an email address, name, or other unique identifier), or thresholds related to how many application downloads may be done or a deadline for downloading the application. Other parameters may include payment of a portion or all of the cost of the application download. Parameters may describe a delivery method for notifying the recipient of the application download. For example, the delivery method may be an electronic display or printed medium depicting an encoded identifier that may be scanned by the recipient's client device. Alternatively, or additionally, parameters may be automatically identified.

Continuing the non-limiting example, after the donor has selected parameters, the application transfer system 116 generates an encoded identifier for delivery to the recipient. The encoded identifier may be any image, text, diagram, or other symbol that may embody the parameters needed for a recipient to retrieve the application download. For example, the encoded identifier may be a barcode, such as a QR code, or other symbol or text that may be scanned and decoded.

The application transfer system 116 then initiates providing the encoded identifier to the recipient via the deliver method identified by the donor. This may be done by electronic display, electronic message, or printed medium. For example, an electronic image of the encoded identifier may be electronically messaged to the recipient via email, simple message service (SMS), or other system. In various embodiments, the electronic image may be displayed on an electronic display, such as a digital billboard. The printed medium may be delivered to the recipient via, for example, a greeting card, advertisement, or other method of delivering a printed form of the encoded identifier.

Continuing the non-limiting example, the recipient at a recipient client 107 obtains the application download by using a client application 161 to capture an image of the encoded identifier. For example, the recipient client application 161 may execute a client application 161 to capture an image of the encoded image that may be analyzed to decode the data in the encoded identifier. In various embodiments, other client applications 161 may be executed to obtain an image of the encoded image. For example, an application store application may be executed to automatically obtain an image of the encoded identifier through the camera on the device. Another embodiment may involve an email client application 161 executed on the recipient client 107 that scans the image from the email when the email is opened in the email client application 161. The image may be obtained automatically or upon some indication through a user interface 167 interacting with the client application 161.

The image of the encoded identifier may be decoded by a client application 161 and the decoded data sent across the network 109 to the application transfer system 116. Alternatively, the image of the encoded identifier captured by the recipient client 107 may be transmitted across the network 109 to the application transfer system 116 for decoding.

Continuing the non-limiting example, the application transfer system 116 authenticates the recipient client 107. Authentication may involve verifying that many of the parameters are satisfied. In various embodiments, where a recipient has been identified by the donor, the recipient may be authenticated by verifying that the recipient has logged into the identified account on the recipient client 107. Where a threshold maximum number of application downloads or a threshold deadline for obtaining the application download was identified, authentication may involve comparing the total number of application downloads obtained to the threshold maximum or the timestamp of the authentication to the threshold deadline or download timeframe. When authorization fails, the application transfer system 116 may contact the donor client 105 for authorization or transmit an error message indicating a failed authorization to the recipient client 107. When authorization succeeds, the application transfer system 116 initiates a download of the application to the recipient client 107.

Figure 2A:
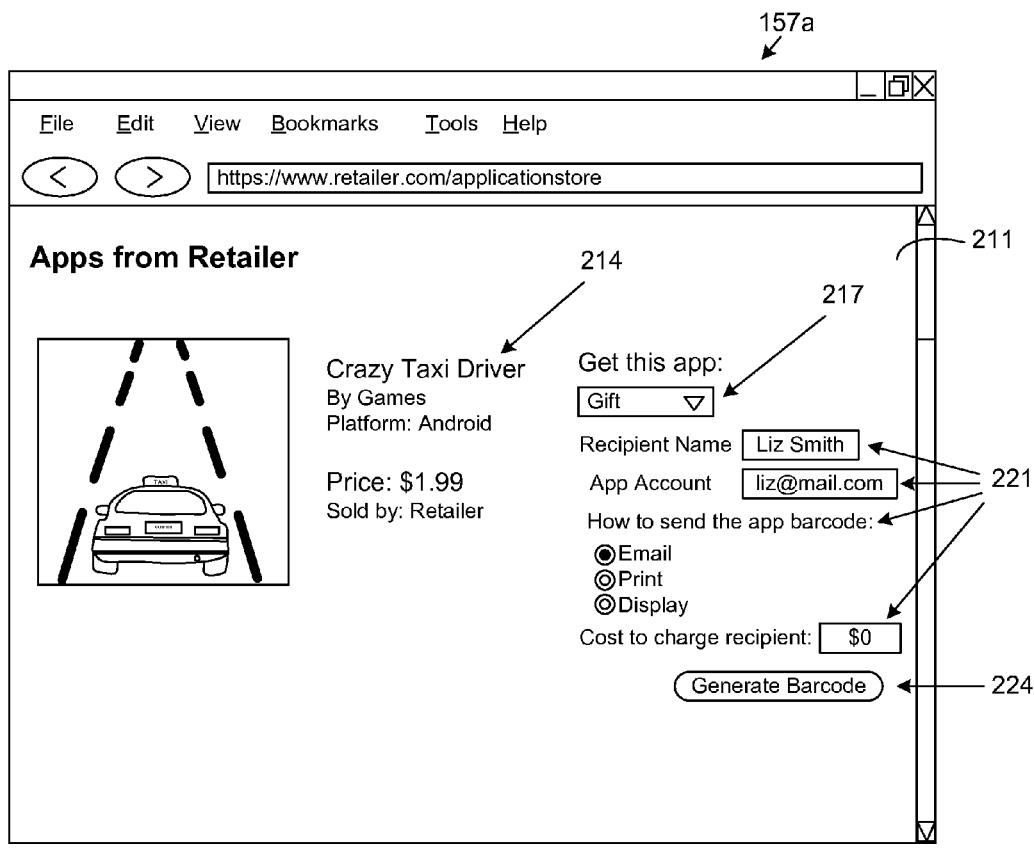
FIGS. 2A-2C are drawings of examples of user interfaces rendered by a client in the networked environment of FIG. 1 according to various embodiments of the present disclosure.

Referring next to FIG. 2A, shown is one example of a user interface 157 (FIG. 1), denoted herein as 157a, rendered by a client application 151 (FIG. 1) executed in a donor client 105 (FIG. 1) in the networked environment 100 (FIG. 1). The user interface 157a includes an application store network page 211 for browsing application downloads 214 and defining parameters 221 for transmitting the application download to another. A donor at a donor client 105 selects an application download 214. Here, the donor is an individual. Alternatively, the donor may be an application distributor, application developer, advertisement entity, a promotions entity, or other entity. Here, the donor has selected the Crazy Taxi Driver application download 214. The donor has selected via a transaction type pick list 217 to transmit the application download as a gift to an individual. Alternatively, the donor may have selected to allow a threshold maximum number of application downloads for multiple recipients or to allow application downloads until a threshold deadline. The donor then defined parameters 221 including the recipient's Liz Smith and the recipient's identifier account liz@mail.com. The donor selected to email the application download to the recipient. Finally, the donor defined the payment distribution parameter 221 to be $0 charged to the recipient. Once the parameters are defined, the donor selects generate barcode 224 to generate the encoded identifier for transmitting to the recipient. Alternatively, another symbol, text, or other encoded identifier may be generated. Because the donor defined the payment distribution to charge nothing to the recipient, the donor will pay the $1.99 owed for the application download through a checkout pipeline. Alternatively, the donor may define another payment distribution, such that the recipient will pay a portion of the $1.99.

Figure 2B:
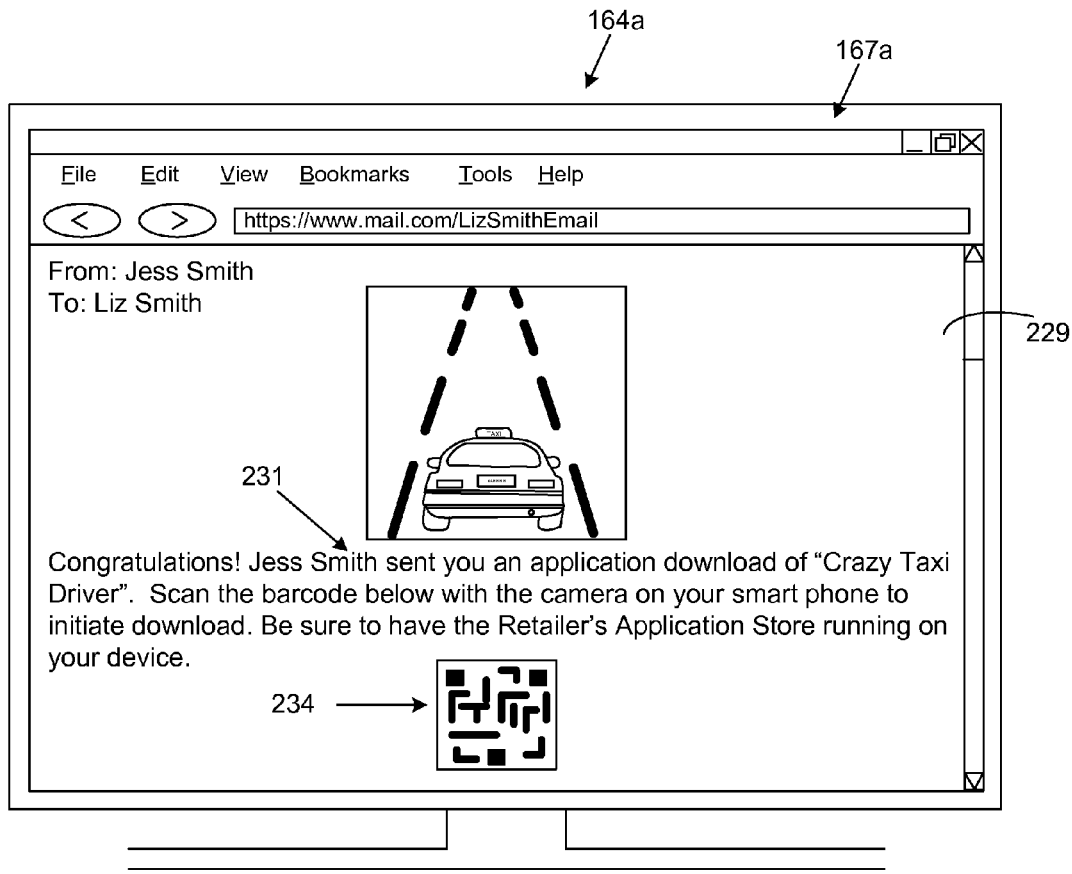
Figure 2B:
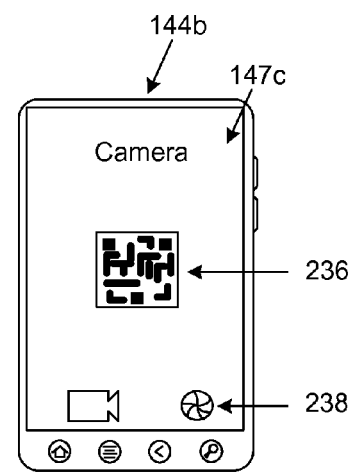

Turning now to FIG. 2B, shown is one example of a user interface 157 (FIG. 1), denoted herein as 157b, rendered by a client application 151 (FIG. 1) executed in a recipient client 107 (FIG. 1) depicted on a display 154, denoted herein as 154a, in the networked environment 100 (FIG. 1). The user interface 157b includes an email network page 229 for receiving email. The network page 211 depicts a message informing the recipient of the application download that was transmitted to a recipient client 107 from the donor 231. Also depicted in FIG. 2B is another example of a user interface 157, denoted herein as 157c, rendered by a client application 151 executed in a recipient client 107 depicted on a display 164, denoted herein as 164b, in the networked environment 100 (FIG. 1). The user interface 167a depicts a camera client application 161 capturing an image 236 of the QR code. To obtain the application download, the recipient client 107 captures an image of the QR code 234 shown on the display 164a with the camera 238 on the recipient client 107. The display 164a may be other than a monitor, such as, the display of a smartphone, digital billboard, or other device. The resulting image is decoded, either by the recipient client 107 or the application transfer system 116 (FIG. 1) and, if the recipient client 107 is authenticated, the application download is initiated.

Figure 2C:
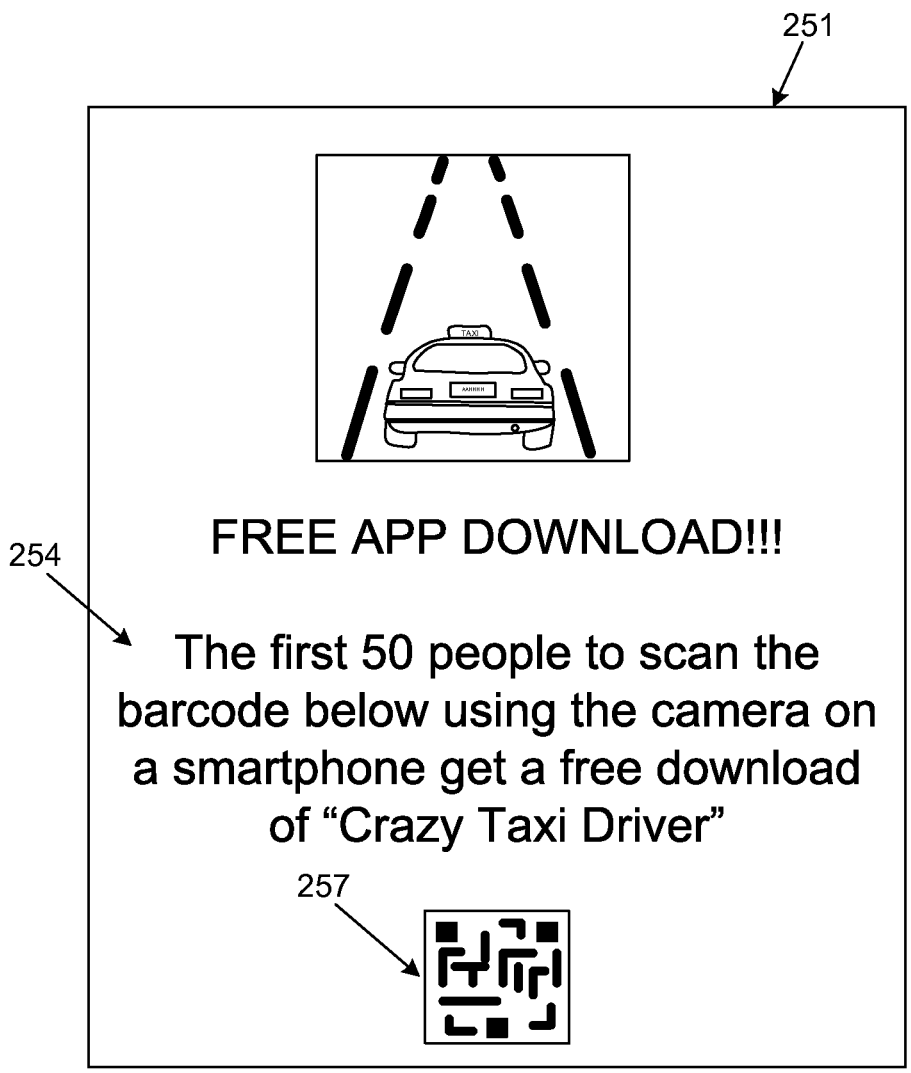

Moving on to FIG. 2C, shown is a printed advertisement 251. The printed advertisement contains a promotion 254 informing multiple recipients of the application download. The threshold maximum number of application downloads has been defined by the donor to be 50. To obtain the application download, 50 recipient clients 107 (FIG. 1) may obtain an image of the QR code 257. Upon capture of the image, the image may be sent to the application transfer system 116 across the network 109 (FIG. 1) for decoding or decoded by the client devices.

Figure 3A:
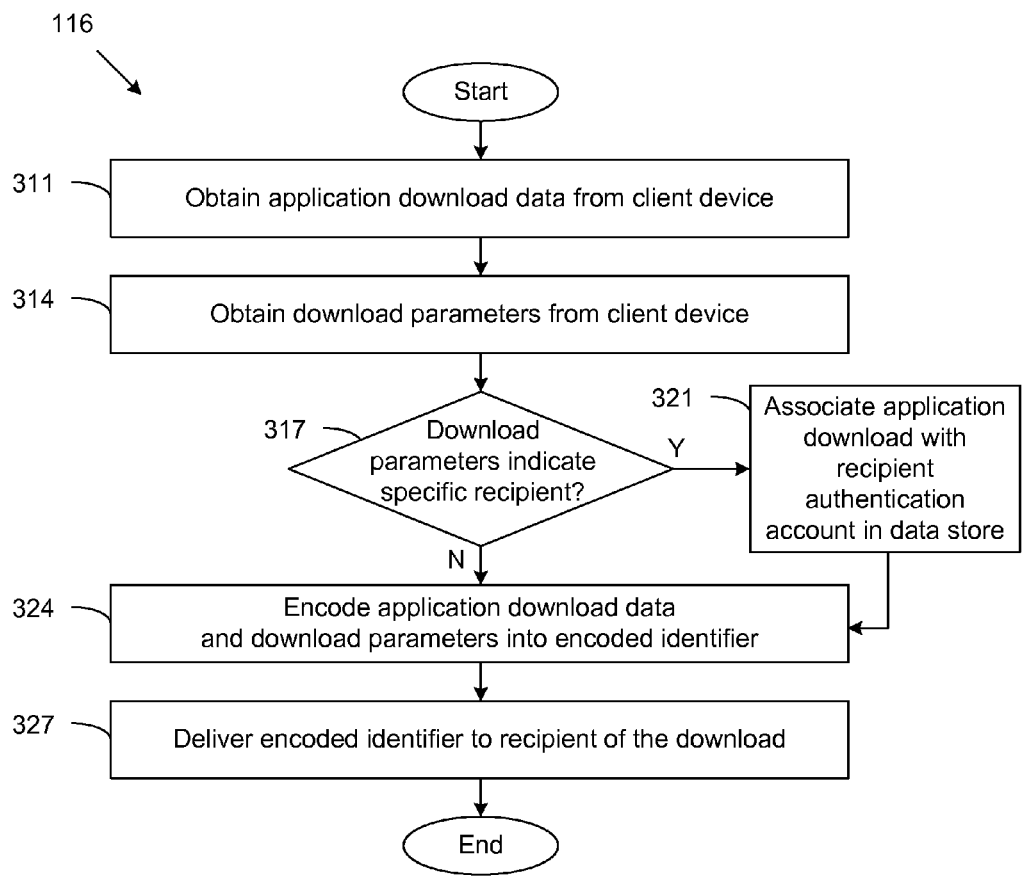
FIGS. 3A-3D are flowcharts illustrating examples of functionality implemented as portions of an application transfer system executed in a computing environment in the networked environment of FIG. 1 according to various embodiments of the present disclosure.

Referring next to FIG. 3A, shown is a flowchart that provides one example of the operation of a portion of the application transfer system 116 according to various embodiments. It is understood that the flowchart of FIG. 3A provides merely an example of the many different types of functional arrangements that may be employed to implement the operation of the portion of the application transfer system 116 as described herein. As an alternative, the flowchart of FIG. 3A may be viewed as depicting an example of steps of a method implemented in the computing environment 103 (FIG. 1) according to one or more embodiments. FIG. 3A depicts obtaining application download parameters from a donor client device and generating an encoded identifier for providing to a recipient client device.

Beginning with box 311, the application transfer system 116 obtains application download data from a donor client 105 (FIG. 1). The data may include, for example, identification of an application to transmit to a recipient. The data may also include payment from the donor for the recipient device to download the application. The data includes any information relevant to transmitting an application download to another. For example, the application transfer system 116 may obtain the data from a donor client 105 as it was input via a user interface.

In box 314, the application transfer system obtains download parameters from the donor's client device. Application download parameters include constraints on the transmission of the application download to another. For example, one application download parameter may be an identifier of the client device authorized to receive the application download when one recipient has been identified. Another application download parameter may be a maximum number of application downloads allowed if multiple recipients exist. One application download parameter may include a deadline for downloading the application. The application download parameters may include a payment distribution between the donor and the recipient if the donor only wants to pay a portion of the cost of the application download. The application download parameters may include delivery methods for transmitting the encoded identifier to the recipient. For example, the delivery method may be by electronic display via email, digital billboard, or another electronic display, or in printed form.

In box 317, the application transfer system 116 evaluates whether the download parameters indicate a specific recipient for the application download. This may be done by evaluating whether the donor client device provided an identifier of the recipient or whether it merely identified a threshold, such as, for example, a deadline for downloading or a maximum number of downloads. If a specific recipient is identified, then the application transfer system 116 proceeds to box 321. If no specific recipient is identified, then the application transfer system 116 proceeds to box 324.

In box 321, the application transfer system 116 associates the application download with the recipient's user account 124 (FIG. 1) as a gift 134 (FIG. 1) in the data store 112 (FIG. 1). Thus, the application transfer system 116 may authenticate the recipient client device by comparing the gift 134 data to the client device credentials. Alternatively, the application transfer system 116 may encode the authentication data into the encoded identifier and decode the data when received from the recipient client device for authentication.

In box 324, the application transfer system 116 generates the encoded identifier by encoding the relevant application download data and download parameters into an encoded identifier. The relevant data and parameters may include any data not stored in the data store, data needed for the recipient client device to download the application, or other data needed for the transmission of an application download. The encoded identifier may be a barcode, such as a QR code, symbols used for encoding data, test, or other encoded identifiers.

In box 327, the application transfer system 116 delivers the encoded identifier to the recipient of the application download. The method of delivery was identified in the application parameters. The encoded identifier may be delivered by, for example, electronic display or printed medium. If the encoded identifier is delivered via electronic display, the encoded identifier may be emailed, messaged, posted on to social media, depicted on a network page, depicted on a digital billboard, or otherwise electronically displayed to the recipient. If the encoded identifier is delivered via a printed medium, it may be printed to posters, flyers, greeting cards, advertisements, papers, books, or other printed materials. Thereafter, this portion of the application transfer system 116 ends.

Figure 3B:
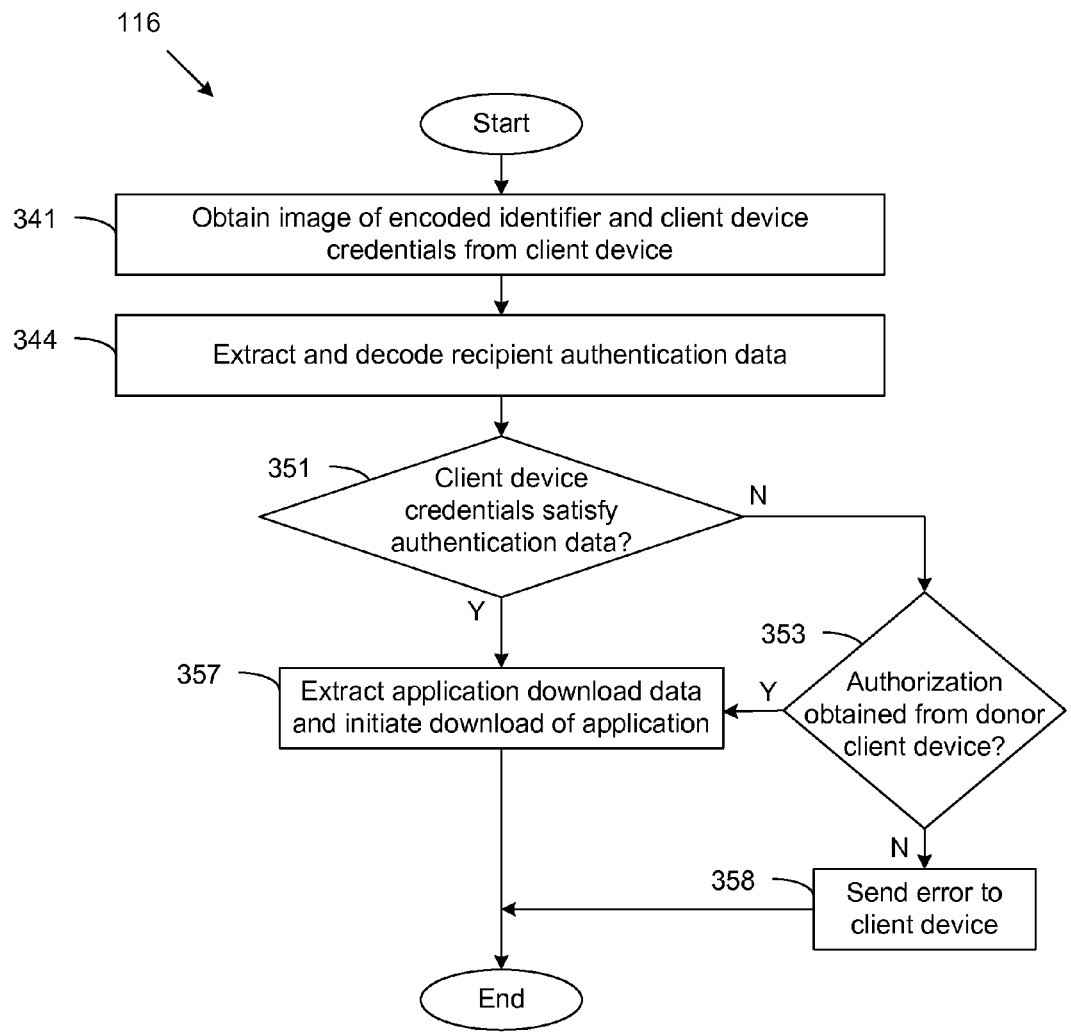

Referring next to FIG. 3B, shown is a flowchart that provides one example of the operation of a portion of the application transfer system 116 according to various embodiments. It is understood that the flowchart of FIG. 3B provides merely an example of the many different types of functional arrangements that may be employed to implement the operation of the portion of the application transfer system 116 as described herein. As an alternative, the flowchart of FIG. 3B may be viewed as depicting an example of steps of a method implemented in the computing environment 103 (FIG. 1) according to one or more embodiments. FIG. 3B depicts a recipient client device obtaining the application download where the donor identified a specific recipient client device.

Beginning with box 341, the application transfer system 116 obtains an image of an encoded identifier and client device credentials from a recipient client device 107 (FIG. 1). The encoded identifier may be in the form of a barcode, image, text, or other symbol containing encoded data. The client device credentials may be an account used to download applications, a login name, or some other unique identifier for the client device. Alternatively, the application transfer system 116 may obtain the data decoded from the encoded identifier by the recipient client device 107 (FIG. 1). The image may have been obtained by the client device in a variety of manners. In one embodiment, the image may have been captured by a camera on the client device. The camera may have captured the image from an electronic display on another client device or from a printed medium. In various embodiments, the image may have been captured by an application executed in the client device. For example, an email application executed in the client device may obtain the image from an email. As another example, an application download store executed on the client device may obtain an image of the encoded identifier from a network page, application screen, or other depiction of the encoded identifier.

Continuing with box 341, the image may be obtained by the application through an automatic recognition, a manual selection, or other identification of the existence of the encoded identifier. For example, a screenshot may be captured by the device to obtain the image. Alternatively, a scan of the network page, application screen, or other depiction of the encoded identifier may be performed to obtain the image. A user may manually identify the encoded image on the screen through various input mechanisms, such as, for example, touching the screen, providing input through an input device, or other identification methods.

In box 344, the application transfer system 116 extracts and decodes recipient authentication data from the encoded identifier. The recipient authentication data was provided as an application download parameter by the donor to uniquely identify the intended recipient of the application download.

In box 351, the application transfer system 116 evaluates whether the client device credentials match the authentication data. This ensures that the client device attempting to receive the application download was the intended recipient. If the client device credentials do not satisfy the authentication data, the application transfer system 116 continues to box 353. If the client device credentials satisfy the authentication data, the application transfer system 116 continues to box 358.

In box 353, the application transfer system 116 evaluates whether authorization may be obtained from the donor client device. This may be done by the application transfer system 116 sending the donor client device a message indicating failed authorization of the recipient client device and indicating the client device credentials of the device attempting to download the application. The donor client device may provide new authentication data in response. Alternatively, or additionally, the application transfer system 116 may request authorization without verifying the recipient client device 107. If the donor client device provides the authorization or if the new authentication data matched the client device credentials, the application transfer system 116 continues to box 357. If the authorization still fails, the application transfer system 116 continues to box 358.

In box 357, if authorization to allow the download was obtained, the application transfer system 116 extract application data from the encoded identifier and initiates the application download to the recipient client device 107. In box 358, if authorization to allow the download was not obtained, the application transfer system 116 sends an error to the recipient client device indicating authorization failed. Thereafter, this portion of the application transfer system 116 ends.

Figure 3C:
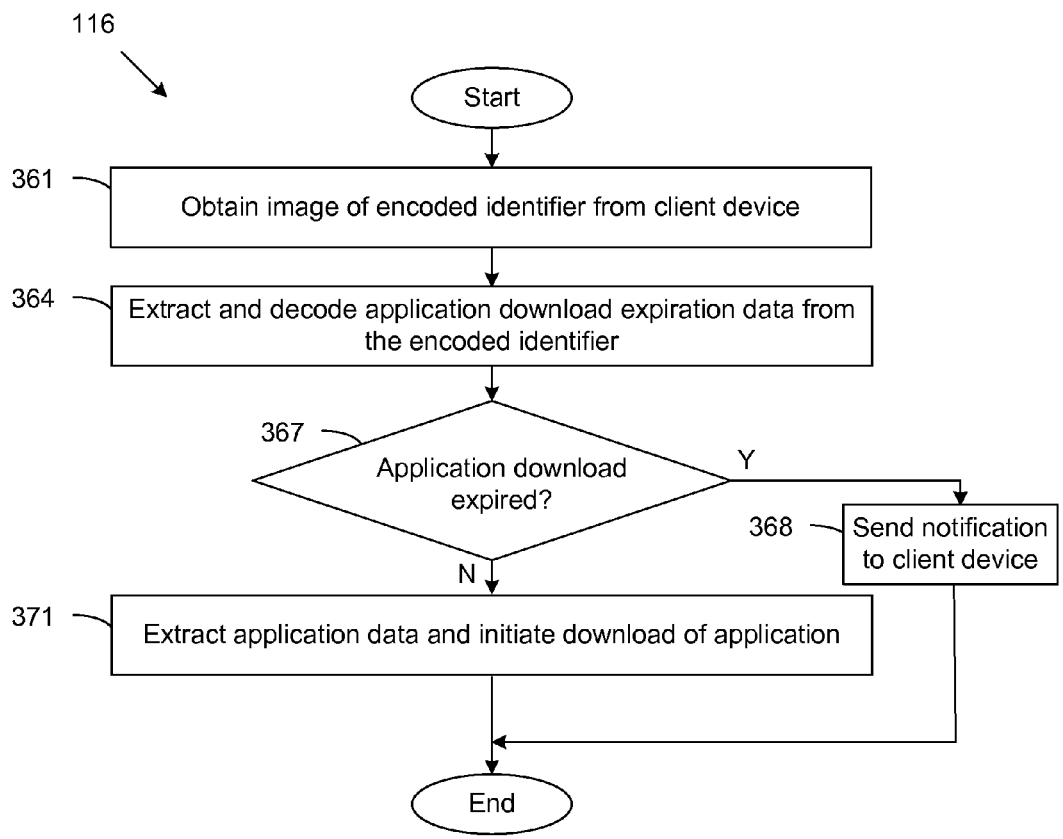

Referring next to FIG. 3C, shown is a flowchart that provides one example of the operation of a portion of the application transfer system 116 according to various embodiments. It is understood that the flowchart of FIG. 3C provides merely an example of the many different types of functional arrangements that may be employed to implement the operation of the portion of the application transfer system 116 as described herein. As an alternative, the flowchart of FIG. 3C may be viewed as depicting an example of steps of a method implemented in the computing environment 103 (FIG. 1) according to one or more embodiments. FIG. 3C depicts recipient client devices obtaining the application download where the donor identified a threshold for when the application download would expire.

Beginning with box 361, the application transfer system 116 obtains the encoded identifier from the recipient client device. The encoded identifier may be in the form of a bar-code, image, text, or other symbol containing encoded data. Alternatively, the application transfer system 116 may obtain the data decoded from the encoded identifier by the recipient client device 107 (FIG. 1).

In box 364, the application transfer system 116 extracts and decodes application download expiration data from the download parameters encoded in the encoded identifier. The application download expiration data may comprise a threshold number of application downloads, a threshold timeframe or deadline for downloading the application, or some other threshold indicating when the application download expires.

In box 367, the application transfer system 116 authorizes the client device by evaluating whether the application download has expired. This may be done by comparing the threshold number of application downloads to a counter of the number of application downloads completed as of the authorization. For example, the application transfer system 116 may have a counter that tracks the number of downloads completed. Each time a new download is completed, the application transfer system 116 may increment the counter. This counter is then compared to the threshold number of downloads prior to authorizing the next download. Alternatively, or additionally, the authorization may comprise comparing the threshold timeframe to a timestamp as of the authorization. The threshold timeframe defines when the application download may be requested by a client. For example, the donor may define the download timeframe to be between Sunday, May 5, 2013, and Sunday, May 12, 2013, and, therefore, the application download may be authorized during that download timeframe. If the application download has expired, the application transfer system 116 proceeds to box 368. If the application download has not expired, the application transfer system 116 proceeds to box 371.

In box 368, if authorization failed, the application transfer system 116 notifies the client device that the application download has expired and/or that the client device is not authorized to download the application. Thereafter, this portion of the application transfer system 116 ends.

In box 371, if authorization succeeded, the application transfer system 116 extracts application data from the encoded identifier and initiates the application download. Thereafter, this portion of the application transfer system 116 ends.

Figure 3D:
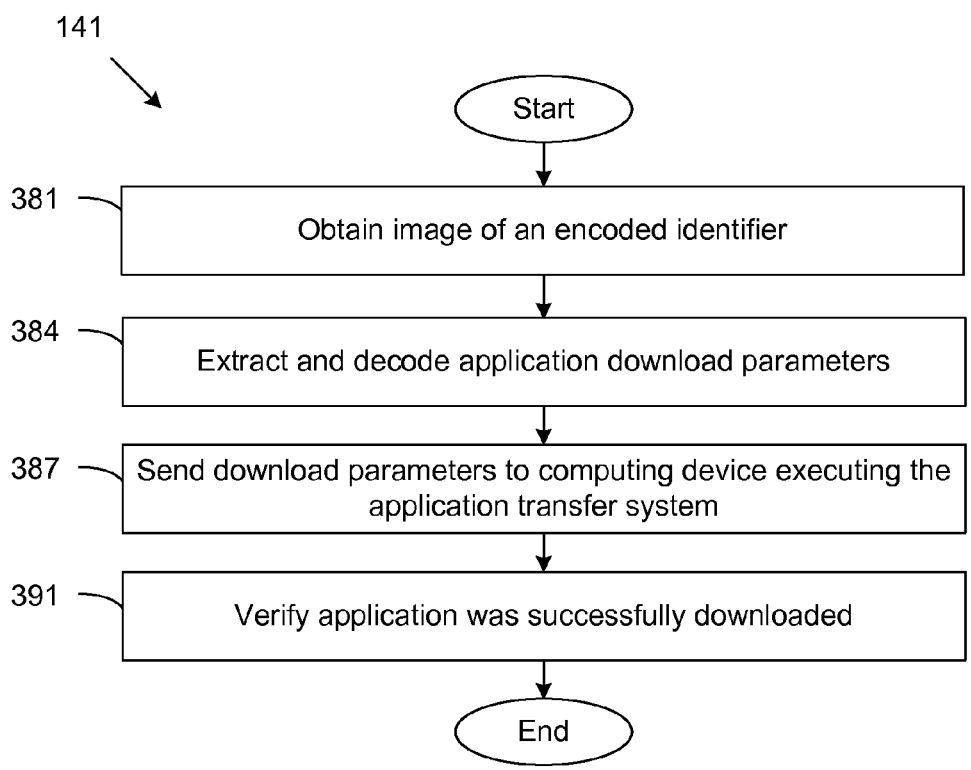

Referring next to FIG. 3D, shown is a flowchart that provides one example of the operation of a portion of a recipient client application 161 (FIG. 1) as it interacts with a portion of the application transfer system 116 according to various embodiments. It is understood that the flowchart of FIG. 3D provides merely an example of the many different types of functional arrangements that may be employed to implement the operation of the portion of the application transfer system 116 as described herein. As an alternative, the flowchart of FIG. 3D may be viewed as depicting an example of steps of a method implemented in the computing environment 103 (FIG. 1) according to one or more embodiments. FIG. 3D depicts the recipient client device obtaining the encoded image, decoding the application download parameters contained in the encoded image, and sending the decoded data to a server hosting the application transfer system 116.

Beginning with box 381, a client application 161 executed on the recipient client 107 obtains an image of an encoded identifier. In one embodiment, a camera client application 161 may obtain the image through the camera in the recipient client 107. Where a camera in the recipient client 107 obtains the image, the camera lens in the recipient client 107 is aligned approximately parallel with the electronic display or printed material depicting the encoded identifier. In various embodiments, an application store client application 161 executed on the recipient client 107 may obtain the image through the camera in the recipient client 107. Alternatively, the client application 161 may otherwise scan the encoded identifier to obtain the image.

In box 384, the client application 161 may extract and decode application download parameters from the encoded identifier. Application download parameters include constraints on the transmission of the application download to another. For example, one application download parameter may be an identifier of the client device authorized to receive the application download. Another application download parameter may be a maximum number of application downloads allowed. One application download parameter may include a deadline for downloading the application. Other data may be included in the application download parameters.

In box 387, the decoded download parameters are transmitted across the network 109 to the computing device 400 (FIG. 4) executing the application transfer system 116. Alternatively, the encoded identifier may be sent to the server executing the application transfer system 116 for decoding.

In box 391, the recipient client application 161 verifies that the application was successfully downloaded. Alternatively, the client application 161 may receive an error or message from the application transfer system 116 indicating that authorization or the download failed. Thereafter, this portion of the client application 161 as it interacts with the application transfer system 116 ends.

Figure 4:
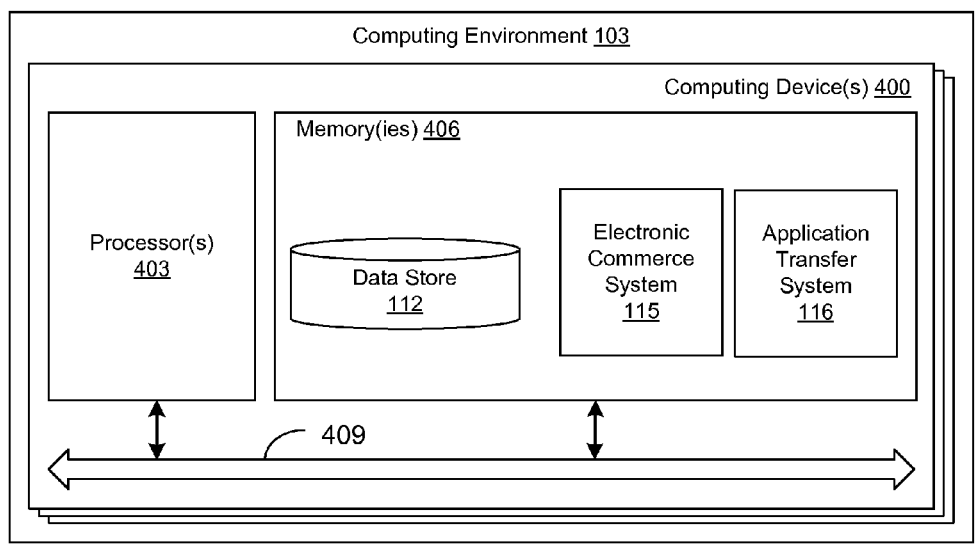
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 103 according to an embodiment of the present disclosure. The computing environment 103 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the electronic commerce system 115, the application transfer system 116, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the electronic commerce system 115, the application transfer system 116, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3A-3D show the functionality and operation of an implementation of portions of the application transfer system 116. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 3A-3D show a specific order of execution, it is understood that the order of execution may differ from that which is depicted. For example, the order of execution of two or more blocks may be scrambled relative to the order shown. Also, two or more blocks shown in succession in FIGS. 3A-3D may be executed concurrently or with partial concurrence. Further, in some embodiments, one or more of the blocks shown in FIGS. 3A-3D may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 115 and the application transfer system 116, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, comprising:
   code that transmits an encoded identifier to a first recipient device, the encoded identifier embodying a plurality of parameters, the parameters including at least an identifier associated with a recipient identified by a donor of an application;
   code that obtains an image of the encoded identifier captured by a camera on a second recipient device from an electronic display associated with the first recipient device;
   code that decodes the parameters from the image of the encoded identifier;
   code that generates an authorization of the second recipient device to download the application; and
   code that initiates the download of the application to the second recipient device after the authorization.

2. The non-transitory computer-readable medium of claim 1, wherein the authorization comprises comparing at least one of:
   the identifier and a credential obtained from the second recipient device;
   a download timeframe and a timestamp indicating when the authorization occurs; or
   a threshold number of downloads and a counter of a plurality of completed application downloads as of the authorization.

3. The non-transitory computer-readable medium of claim 2, the code that generates the authorization further comprising code that obtains an approval from a donor client device when a comparison fails.

4. A system, comprising:
   at least one computing device; and
   an application transfer service executable in the at least one computing device, the application transfer application comprising:
   logic that obtains at least one of a plurality of parameters from a first client device, the parameters being associated with gifting an application download to a second client device;
   logic that transmits an encoded identifier comprising at least one of the parameters to a third client device;
   logic that obtains an image of the encoded identifier as captured by the second client device from a display associated with the third client device;
   logic that compares a first identifier embodied in one of the parameters decoded from the image of the encoded identifier to a credential associated with the second client device; and
   logic that initiates the application download of an application identified in the encoded identifier to the second client device when the first identifier equals the credential.

5. The system of claim 4, wherein the encoded identifier comprises at least one of a barcode, a graphic, or a text string.

6. The system of claim 4, wherein the first identifier comprises a user account identifier associated with the second client device capable of downloading the application.

7. The system of claim 4, wherein at least one of the parameters comprises the first identifier.

8. The system of claim 4, wherein at least one of the parameters comprises a payment distribution between a first user associated with the first client device and a second user associated with the second client device.

9. The system of claim 4, wherein the image of the encoded identifier is captured by an application executed on the second client device.

10. The system of claim 4, wherein the image is obtained upon capture by a camera operated on the second client device.

11. The system of claim 4, wherein at least one of the parameters comprises a delivery method of the encoded identifier to the third client device.

12. The system of claim 11, wherein the delivery method comprises at least one of an email comprising the encoded identifier, a network page comprising the encoded identifier, or an electronic encoding of the encoded identifier.

13. The system of claim 4, wherein at least one of the first client device, the second client device, or the third client device comprises a mobile computing device.

14. A method, comprising:
obtaining, via a computing device, from a first client device, at least one of a plurality of conditions associated with an offer of an application download to a second client device;
obtaining, via the computing device, a request from the second client device to receive the application download;
validating, via the computing device, the request based at least in part on whether at least one of a plurality of characteristics associated with the request satisfies at least one of the conditions;
requesting, via the computing device, authorization from the first client device when the request fails to satisfy at least one of the conditions; and
initiating, via the computing device, the application download to the second client device when the request satisfies the at least one of the conditions.

15. The method of claim 14, further comprising verifying whether the second client device is compatible with the application download.

16. The method of claim 14, wherein the validating of the request further comprises sending an error to the second client device when the at least one of the characteristics associated with the request fails to satisfy the at least one of the conditions.

17. The method of claim 14, wherein at least one of the conditions comprises a timeframe for downloading the application download.

18. The method of claim 14, wherein at least one of the conditions comprises that only a predetermined maximum number of the application download are to occur.

19. The method of claim 14, wherein the request comprises an encoded image as captured by a camera on the second client device of a replication of the encoded image.

20. The method of claim 14, wherein the request comprises an encoded image as captured by an application on the second client device.

* * * * *